(12) United States Patent
Liu

(10) Patent No.: US 11,445,492 B2
(45) Date of Patent: Sep. 13, 2022

(54) METHODS FOR RECEIVING AND SENDING DOWNLINK CONTROL INFORMATION, USER EQUIPMENT, AND BASE STATION

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 156 days.

(21) Appl. No.: 16/921,164

(22) Filed: Jul. 6, 2020

(65) Prior Publication Data

US 2020/0337034 A1    Oct. 22, 2020

Related U.S. Application Data (63) Continuation of application No. PCT/CN2018/073659, filed on Jan. 22, 2018.

(51) Int. Cl.
*H04W 72/04*    (2009.01)

(52) U.S. Cl.
CPC ..... *H04W 72/042* (2013.01); *H04W 72/0446* (2013.01)

(58) Field of Classification Search
CPC ............. H04W 68/02; H04W 52/0229; H04W 72/042; H04W 72/0446; H04W 72/1268; H04W 72/126; H04W 72/044; H04L 1/1812
See application file for complete search history.

(56) References Cited

U.S. PATENT DOCUMENTS

| | | | | |
|---|---|---|---|---|
| 10,863,494 | B2 * | 12/2020 | Zhang | ..................... H04L 5/005 |
| 2017/0289877 | A1 | 10/2017 | Wu | |
| 2019/0239189 | A1 * | 8/2019 | Hwang | ............. H04W 52/0216 |
| 2020/0213980 | A1 * | 7/2020 | Takeda | .................. H04L 1/1854 |

FOREIGN PATENT DOCUMENTS

| | | |
|---|---|---|
| CN | 101541018 A | 9/2009 |
| CN | 102651890 A | 8/2012 |
| CN | 103648175 A | 3/2014 |
| CN | 106454694 A | 2/2017 |

OTHER PUBLICATIONS

3GPP TS 36.212 V12.9.1 (Jan. 2018), $3^{rd}$ Generation Partnership Project, Technical Specification Group Radio Access Network Evolved Universal Terrestrial Radio Access (E-UTRA) Multiplexing and channel coding (Release 12), 95 pgs.
International Search Report in the International Application No. PCT/CN2018/073659, dated Sep. 30, 2018.

* cited by examiner

*Primary Examiner* — Wei Zhao
(74) *Attorney, Agent, or Firm* — Finnegan, Henderson, Farabow, Garrett & Dunner, L.L.P.

(57) ABSTRACT

An information transmission method includes: receiving first downlink control information sent by a base station through a first subslot, the first downlink control information including time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by the base station.

16 Claims, 10 Drawing Sheets

FIG. 1

UE receives first downlink control information sent by a base station through a first subslot, and the first downlink control information includes time-frequency position indication information and repeat count indication information ~201

FIG. 2

A base station sends first downlink control information to UE through a first subslot, and the first downlink control information includes time-frequency position indication information and repeat count indication information ~301

METHODS FOR RECEIVING AND SENDING DOWNLINK CONTROL INFORMATION, USER EQUIPMENT, AND BASE STATION

CROSS-REFERENCE TO RELATED APPLICATION

This application is a continuation application of International Application PCT/CN2018/073659, filed Jan. 22, 2018, the entire content of which is incorporated herein by reference.

TECHNICAL FIELD

The present disclosure generally relates to the field of wireless communication, and more particularly, to an information transmission method, device and system, and a storage medium.

BACKGROUND

For adaptation to constantly emerging Internet applications of Internet of things, self-driving, telemedicine, and the like, a communication system may be required to be capable of supporting various types of communication services. Ultra reliable & low latency communication (uRLLC) service is a relatively popular communication service type as well as the most important communication service that a future Fifth Generation Mobile Communication Technology (5G) communication system may be supported. The uRLLC service has relatively high requirements on both communication data transmission latency and communication data transmission reliability, but conventional downlink control information configured to schedule communication data is unlikely to meet the requirements. Therefore, there is an urgent need for downlink control information capable of meeting the requirements of the uRLLC service on low latency and high reliability.

SUMMARY

According to a first aspect of embodiments of the present disclosure, an information transmission method may include: receiving first downlink control information sent by a base station through a first subslot, the first downlink control information including time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by the base station.

According to a second aspect of embodiments of the present disclosure, an information transmission method may include: sending first downlink control information to UE through a first subslot, the first downlink control information including time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by a base station.

According to a third aspect of embodiments of the present disclosure, user equipment may include: a processor; and a memory configured to store instructions executable by the processor. The processor is configured to: receive first downlink control information sent by a base station through a first subslot, the first downlink control information including time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by the base station.

According to a fourth aspect of embodiments of the present disclosure, a base station may include: a processor; and a memory configured to store instructions executable by the processor. The processor is configured to: send first downlink control information to UE through a first subslot, the first downlink control information including time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by a base station.

The technical solutions in embodiments of the present disclosure may have the following beneficial effects.

The UE receives the first downlink control information sent by the base station to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. The first downlink control information provided in the embodiments of the present disclosure can meet requirements of the uRLLC service on low latency and high reliability.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
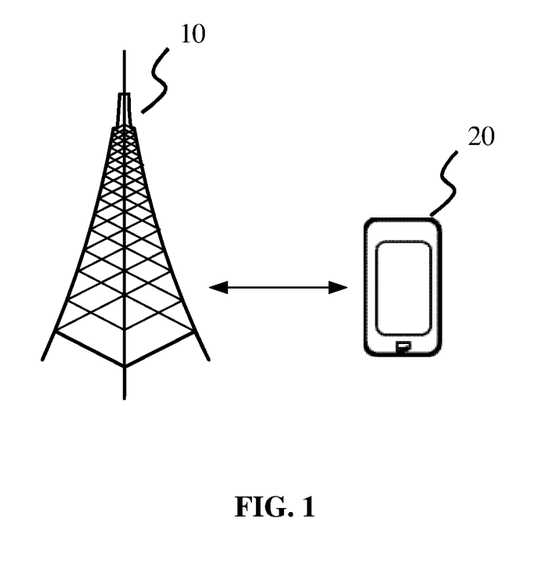
FIG. 1 is a schematic diagram of an information transmission system, according to an exemplary embodiment.

FIG. 1 is a schematic diagram of a system for information transmission, according to an exemplary embodiment. As illustrated in FIG. 1, the system includes a base station 10 and user equipment (UE) 20. The base station 10 may be coupled with the UE 20 through a communication network, and the UE 20 may be any UE in a cell served by the base station 10. The communication network may be a 5G communication network or any other communication network similar to the 5G communication network.

In a Long Term Evolution (LTE) communication system, a radio frame may include 10 subframes, and each subframe may include two time slots. For example, a length of each subframe may be 1 ms, and a length of each time slot may be 0.5 ms.

In a 5G communication system, for reducing communication latency, the subframe is structurally redesigned and may include more than two sub-time slots, also referred to as subslots. For example, the subframe in the 5G communication system may include 6 subslots, and a length of each subframe may still be 1 ms.

Figure 2:
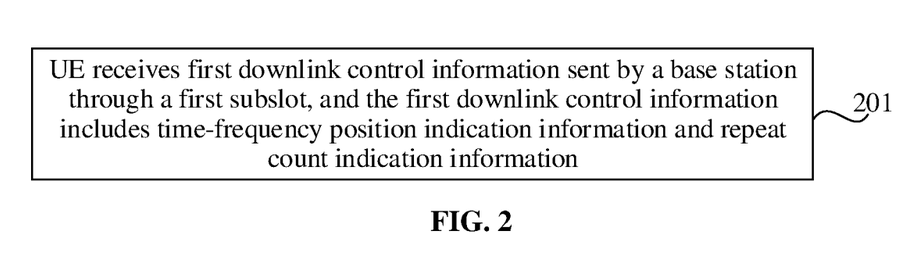
FIG. 2 is a flow chart of an information transmission method, according to an exemplary embodiment.

FIG. 2 is a flow chart showing an information transmission method, according to an exemplary embodiment. As illustrated in FIG. 2, the information transmission method is applied to the UE 20 illustrated in FIG. 1. The information transmission method may include the following step.

In step 201, the UE receives first downlink control information sent by a base station through a first subslot, and the first downlink control information includes time-frequency position indication information and repeat count indication information.

The time-frequency position indication information is configured to indicate a time-frequency position of a downlink resource bearing target communication data in the first subslot, and the repeat count indication information is configured to indicate a count of repeated transmissions of the target communication data by the base station, that is, a count of repeatedly transmitting the target communication data by the base station.

In the embodiment, the UE receives the first downlink control information sent by the base station to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. Therefore, the first downlink control information in the embodiment can meet requirements of uRLLC service on low latency and high reliability.

Figure 3:
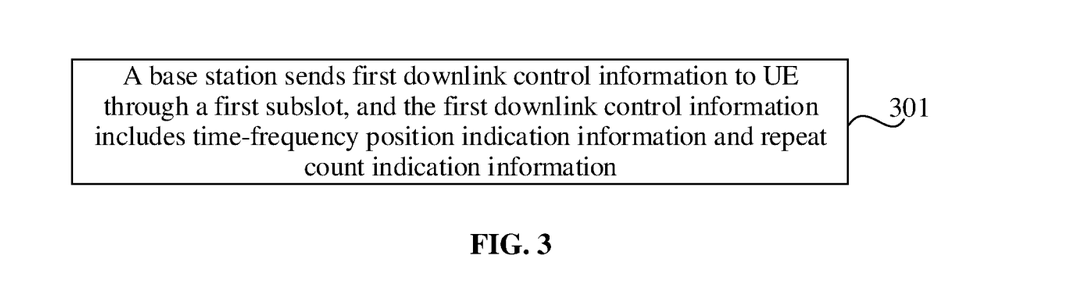
FIG. 3 is a flow chart of an information transmission method, according to an exemplary embodiment.

FIG. 3 is a flow chart showing an information transmission method, according to an exemplary embodiment. As illustrated in FIG. 3, the information transmission method is applied to the base station 10 illustrated in FIG. 1. The information transmission method may include the following step.

In step 301, the base station sends first downlink control information to UE through a first subslot, and the first downlink control information includes time-frequency position indication information and repeat count indication information.

The time-frequency position indication information is configured to indicate a time-frequency position of a downlink resource bearing target communication data in the first subslot, and the repeat count indication information is configured to indicate a count of repeated transmissions of the target communication data by the base station.

In the embodiment, the base station sends the first downlink control information to the UE to cause the UE to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. Therefore, the first downlink control information provided in the embodiment can meet requirements of the uRLLC service on low latency and high reliability.

Figure 4:
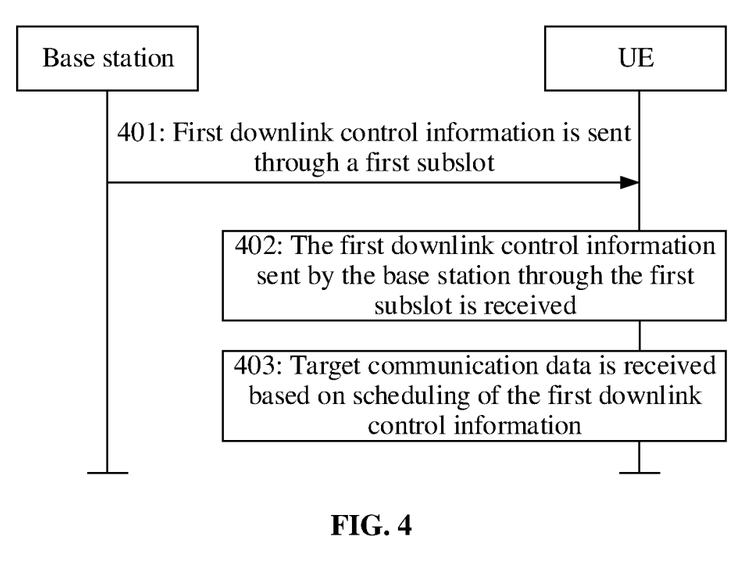
FIG. 4 is a flow chart of an information transmission method, according to an exemplary embodiment.

FIG. 4 is a flow chart showing an information transmission method, according to an exemplary embodiment. For example, the information transmission method is applied to the system illustrated in FIG. 1. The information transmission method includes the following steps.

In step 401, a base station sends first downlink control information to UE through a first subslot.

For example, the first downlink control information is configured to schedule uRLLC communication data, and meets latency and reliability requirements of the uRLLC service. The base station may send the first downlink control information to the UE to instruct the UE to receive the uRLLC communication data according to the first downlink control information. In an embodiment, the base station may send the first downlink control information to the UE based on a subframe in the 5G communication system, referred to herein as a target subframe. As described above, the subframe in the 5G communication system may include 6 subslots, and a length of each subframe may be 1 ms. The base station may send the first downlink control information to the UE through a downlink subslot in the target subframe. The first subslot in step 401 may be a downlink subslot in the target subframe.

The first downlink control information may include time-frequency position indication information and repeat count indication information.

The time-frequency position indication information is configured to indicate a time-frequency position of a downlink resource bearing target communication data in the first subslot. In other words, the downlink resource in the first subslot may be scheduled through the first downlink control information. Conventional downlink control information in an LTE communication system usually schedules a downlink resource in a subframe, that is, the conventional downlink control information in the LTE communication system is usually configured to indicate a time-frequency position of a downlink resource bearing communication data in a subframe. Therefore, compared with the conventional downlink control information in the LTE communication system, the first downlink control information in the embodiment of the present disclosure is smaller in time-domain scheduling granularity. In such case, in a length of a subframe, the UE may receive communication data for many times according to scheduling of the base station. For example, when a subframe includes 6 subslots, the UE may receive communication data for six times according to scheduling of the base station in a length of the subframe. For a receiving process, the latency may be ⅙ ms. The conventional downlink control information in the LTE communication system schedules a downlink resource in a subframe, such that the UE may receive communication data once according to scheduling of the base station in a length of the subframe, and the latency for a receiving process may be 1 ms. It can be seen that scheduling the downlink resource based on the first downlink control information may reduce the transmission latency.

In the embodiment, the target communication data is communication data sent to the UE by the base station, and the downlink resource bearing the target communication data may be in a physical downlink shared channel (PDSCH) in the first subslot.

The repeat count indication information is configured to indicate a count n of repeated transmissions of the target communication data by the base station (n is a positive integer greater than or equal to 2), and the UE may determine positions of n downlink resources through which the base station repeatedly sends the target communication data according to an indication of the repeat count indication information and a preset time-frequency position determination rule. In such a manner, the UE may sequentially receive the target communication data on the n downlink resources until the UE correctly receives the target communication data. Since the UE has n opportunities for receiving the target communication data, the probability that the UE correctly receives the target communication data is relatively high, and the transmission reliability of the target communication data is relatively high.

The first downlink control information in the embodiment of the present disclosure can meet requirements of the uRLLC service on low latency and high reliability.

In an embodiment, the base station may send the first downlink control information through a PDCCH in the first subslot. The UE, when receiving the first downlink control information, may perform blind detection on the PDCCH so as to receive the first downlink control information sent by the base station in the PDCCH. For reducing the complexity in blind detection of the UE on the PDCCH, the UE may perform blind detection for the first downlink control information based on a blind detection strategy identical with the strategy for short downlink control information (sDCI), that is, the UE may perform blind detection for the sDCI and the first downlink control information based on the same blind detection strategy, such that the complexity in blind detection of the UE on the PDCCH may be reduced. In addition, the UE performs blind detection for the sDCI and the first downlink control information based on the same blind detection strategy, such that a count of blind detections of the UE for the PDCCH may be reduced. If blind detection is performed for the sDCI and the first downlink control information based on different blind detection strategies, a total count of blind detections for the sDCI and the first downlink control information may be doubled. The sDCI in a 5G communication system may be transmitted through a PDCCH in a subslot and is configured to schedule the subslot bearing the sDCI.

For ensuring that the UE may perform blind detection for the sDCI and the first downlink control information based on the same blind detection strategy, a length of the first downlink control information may be identical with a length of the sDCI. In addition, the base station, before sending the first downlink control information to the UE, may scramble the first downlink control information based on a preset radio network temporary identifier (RNTI). For example, the base station may scramble a cyclic redundancy check (CRC)

of the first downlink control information based on the preset RNTI. A type of the preset RNTI is identical with a type of an RNTI used when the base station scrambles the sDCI.

In addition, for ensuring that the UE may correctly distinguish the sDCI and the first downlink control information, the first downlink control information may further include an indication identifier, and the indication identifier may indicate that the first downlink control information is downlink control information including the time-frequency position indication information and the repeat count indication information. For example, a length of the indication identifier may be one bit.

In step 402, the UE receives the first downlink control information sent by the base station through the first subslot.

As described above, the UE may perform blind detection on the PDCCH in the first subslot to receive the first downlink control information, and moreover, in the blind detection process for the PDCCH, the blind detection strategy adopted by the UE may be identical with the blind detection strategy for blind detection for the sDCI.

The blind detection strategy may include that: the UE performs blind detection on at least one of a common search space or UE-specific search space in the PDCCH based on the length of the first downlink control information, which may be the same as the length of the sDCI. In the blind detection process, the UE may try to descramble information in at least one of the common search space or the UE-specific search space by using the preset RNTI. After successful descrambling, the UE may determine that the information is the sDCI or first downlink control information sent by the base station, and then the UE may determine whether the information is the first downlink control information based on the indication identifier.

In step 403, the UE receives target communication data based on scheduling of the first downlink control information.

The UE, after receiving the first downlink control information, may determine the time-frequency position of the downlink resource bearing the target communication data in the first subslot based on the time-frequency position indication information in the first downlink control information, and receive the target communication data at the time-frequency position.

In addition, the UE may determine the count n of the repeated transmissions of the target communication data by the base station based on the repeat count indication information in the first downlink control information. The count n may not include a count of transmissions of the target communication data by the base station in the first subslot. Then, the UE may determine the time-frequency positions of the n downlink resources through which the base station repeatedly sends the target communication data according to the count n and the preset time-frequency position determination rule. The n downlink resources may be in n second subslots respectively, and the second subslots are subslots different from the first subslot. Then, the UE may sequentially receive the target communication data on the n downlink resources until the UE correctly receives the target communication data.

In the embodiment, the UE, after determining the positions of the n downlink resources through which the base station repeatedly sends the target communication data, may sequentially receive the target communication data on the n downlink resources without scheduling of the base station. Under this condition, the UE may not receive second downlink control information in the n second subslots where the n downlink resources are located or reside respectively, and a type of the second downlink control information is identical with a type of the first downlink control information. Therefore, the complexity in blind detection of the UE and the count of the blind detections may further be reduced.

In the above embodiments, the UE receives the first downlink control information sent by the base station to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. Therefore, the first downlink control information provided in the embodiment of the present disclosure can meet requirements of the uRLLC service on low latency and high reliability.

Figure 5A:
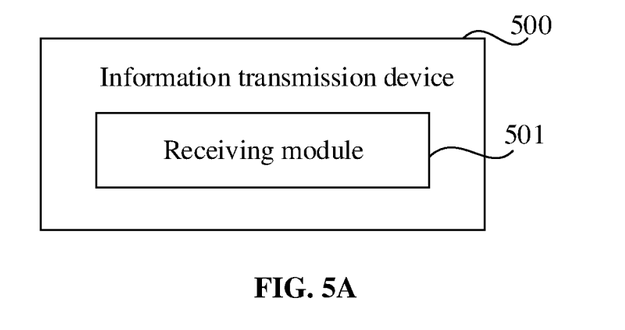
FIG. 5A is a block diagram of an information transmission device, according to an exemplary embodiment.

FIG. 5A is a block diagram of an information transmission device 500, according to an exemplary embodiment. The information transmission device 500 may be the UE 20 illustrated in FIG. 1. Referring to FIG. 5A, the information transmission device 500 includes a receiving module 501.

The receiving module 501 is configured to receive first downlink control information sent by a base station through a first subslot, and the first downlink control information includes time-frequency position indication information and repeat count indication information.

The time-frequency position indication information is configured to indicate a time-frequency position of a downlink resource bearing target communication data in the first subslot, and the repeat count indication information is configured to indicate a count of repeated transmissions of the target communication data by the base station.

In an embodiment, the receiving module 501 is configured to perform blind detection for the first downlink control information in a PDCCH in the first subslot based on a preset blind detection strategy, and the preset blind detection strategy is identical with a strategy for blind detection of UE for sDCI.

In an embodiment, a length of the first downlink control information is identical with a length of the sDCI.

In an embodiment, the first downlink control information includes an indication identifier, and the indication identifier is configured to indicate that the first downlink control information is downlink control information including the time-frequency position indication information and the repeat count indication information.

In an embodiment, a length of the indication identifier is one bit.

Figure 5B:
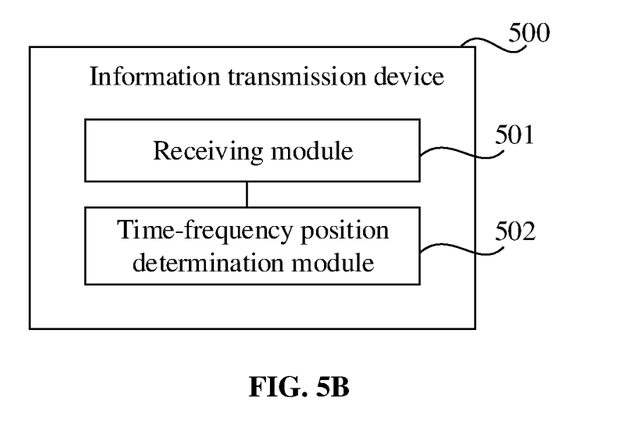
FIG. 5B is a block diagram of an information transmission device, according to an exemplary embodiment.

In an embodiment, illustrated in FIG. 5B, the information transmission device 500 further includes a time-frequency position determination module 502.

The time-frequency position determination module 502 is configured to determine n second subslots according to the count n indicated by the repeat count indication information and a preset time-frequency position determination rule, and the n second subslots are subslots through which the base station repeatedly sends the target communication data.

The receiving module 501 is configured to not execute an operation of receiving second downlink control information in the n second subslots, and a type of the second downlink control information is identical with a type of the first downlink control information.

In the above embodiments, the first downlink control information sent by the base station is received to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. Therefore, the first downlink control information provided in the embodiment of the present disclosure can meet requirements of the uRLLC service on low latency and high reliability.

With respect to the device in the above embodiments, the specific manners for performing operations by individual modules therein have been described in detail in the method embodiments, which will not be repeated herein.

Figure 6:
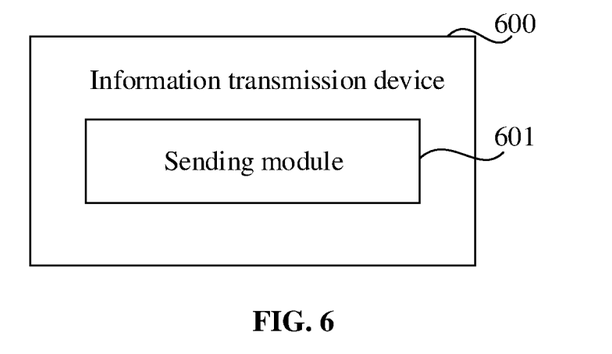
FIG. 6 is a block diagram of an information transmission device, according to an exemplary embodiment.

FIG. 6 is a block diagram of an information transmission device 600, according to an exemplary embodiment. The information transmission device 600 may be the base station 10 illustrated in FIG. 1. Referring to FIG. 6, the information transmission device 600 includes a sending module 601.

The sending module 601 is configured to send first downlink control information to UE through a first subslot, and the first downlink control information includes time-frequency position indication information and repeat count indication information.

The time-frequency position indication information is configured to indicate a time-frequency position of a downlink resource bearing target communication data in the first subslot, and the repeat count indication information is configured to indicate a count of repeated transmissions of the target communication data by a base station.

In an embodiment, the sending module 601 is configured to scramble the first downlink control information based on a preset RNTI, a type of the preset RNTI being identical with a type of an RNTI used by the base station to scramble sDCI, and send the scrambled first downlink control information to the UE through the first subslot.

In an embodiment, a length of the first downlink control information is identical with a length of the sDCI.

In an embodiment, the first downlink control information includes an indication identifier, and the indication identifier is configured to indicate that the first downlink control information is downlink control information including the time-frequency position indication information and the repeat count indication information.

In an embodiment, a length of the indication identifier is one bit.

In the above embodiments, the first downlink control information is sent to the UE to cause the UE to receive the target communication data according to scheduling of the first downlink control information. The first downlink control information includes the time-frequency position indication information configured to indicate the time-frequency position of the downlink resource bearing the target communication data in the first subslot and the repeat count indication information configured to indicate the count of the repeated transmissions of the target communication data by the base station. In such a manner, the downlink resource in the first subslot may be scheduled through the first downlink control information. Compared with conventional downlink control information for scheduling a downlink resource in a subframe, the first downlink control information is smaller in time-domain scheduling granularity, such that the latency of reception of the target communication data by the UE according to scheduling of the first downlink control information is relatively low. The count of the repeated transmissions of the target communication data by the base station may be indicated by the first downlink control information based on the repeat count indication information to cause the UE to repeatedly receive the target communication data according to an indication of the repeat count indication information, such that the probability that the UE correctly receives the target communication data is improved, and the transmission reliability of the target communication data is ensured. Therefore, the first downlink control information provided in the embodiment of the present disclosure can meet requirements of the uRLLC service on low latency and high reliability.

With respect to the device in the above embodiment, the specific manners for performing operations for individual modules therein have been described in detail in the embodiment regarding the method, which will not be elaborated herein.

Figure 7:
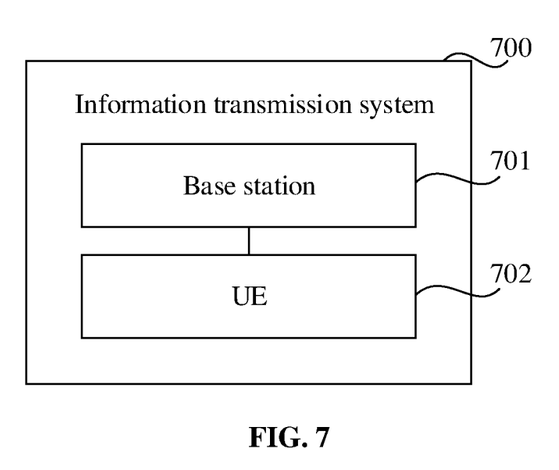
FIG. 7 is a block diagram of an information transmission system, according to an exemplary embodiment.

FIG. 7 is a block diagram of an information transmission system 700, according to an exemplary embodiment. As illustrated in FIG. 7, the information transmission system 700 includes a base station 701 and UE 702.

The base station 701 and the UE 702 are configured to execute the information transmission method illustrated in FIG. 4.

Figure 8:
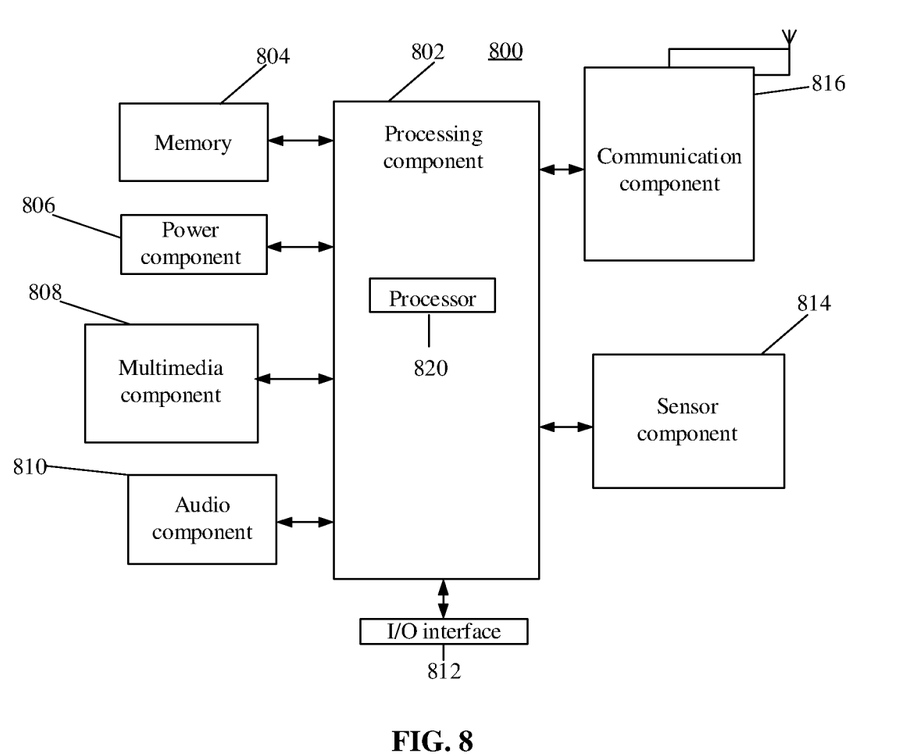
FIG. 8 is a block diagram of an information transmission device, according to an exemplary embodiment.

FIG. 8 is a block diagram of an information transmission device 800, according to an exemplary embodiment. For example, the device 800 may be UE, such as a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above-mentioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access a communication-standard-based wireless network, such as a wireless fidelity (WiFi) network, a 5G network, etc. In an exemplary embodiment, the communication component 816 receives a broadcast signal or broadcast associated information from an external broadcast management system through a broadcast channel In an exemplary embodiment, the communication component 816 further includes a near field communication (NFC) module to facilitate short-range communications. In an exemplary embodiment, the communication component 816 may be implemented based on a radio frequency identification (RFID) technology, an infrared data association (IrDA) technology, an ultra-wide band (UWB) technology, a Bluetooth (BT) technology and other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the method executed by UE in the information transmission methods provided in the embodiments of the present disclosure.

In an exemplary embodiment, there is also provided a non-transitory computer-readable storage medium including instructions, such as included in the memory 804, executed by the processor 820 of the device 800 to perform the methods described above. For example, the non-transitory computer-readable storage medium may be a ROM, a random access memory (RAM), a compact disc read-only memory (CD-ROM), a magnetic tape, a floppy disc, an optical data storage device, and the like.

Figure 9:
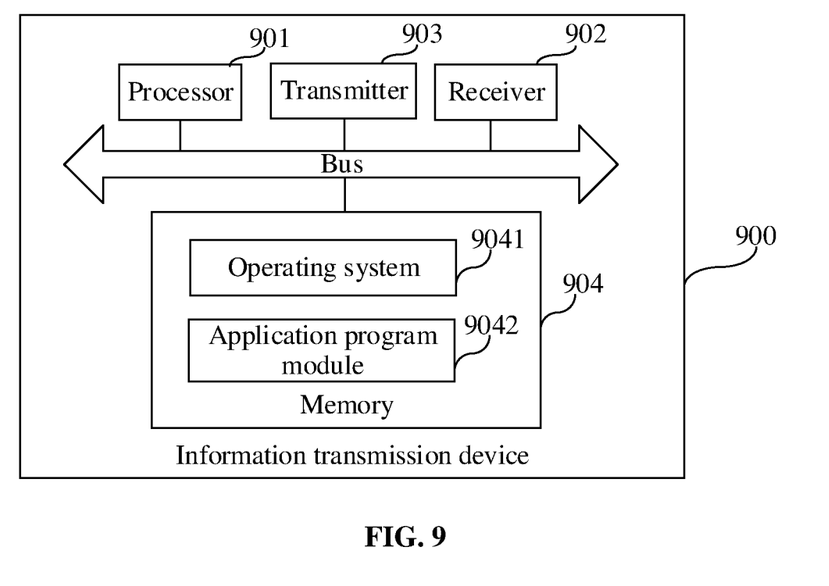
FIG. 9 is a block diagram of an information transmission device, according to an exemplary embodiment.

FIG. 9 is a block diagram of an information transmission device 900, according to an exemplary embodiment. For example, the information transmission device 900 may be a base station. As illustrated in FIG. 9, the information transmission device 900 may include a processor 901, a receiver 902, a transmitter 903, and a memory 904. The receiver 902, the transmitter 903, and the memory 904 are coupled with the processor 901 through a bus respectively.

The processor 901 includes one or more processing cores, and the processor 901 runs a software program to perform the methods described above. The memory 904 may be configured to store the software program. In an embodiment, the memory 904 may store an operating system 9041 and an application program module 9042. The receiver 902 is configured to receive communication data sent by another device, and the transmitter 903 is configured to send communication data to another device.

In an exemplary embodiment, there is also provided a non-transitory computer-readable storage medium including instructions, such as included in the memory 904, executed by the processor 901 of the device 900 to perform the methods described above. For example, the non-transitory computer-readable storage medium may be a ROM, a random access memory (RAM), a compact disc read-only memory (CD-ROM), a magnetic tape, a floppy disc, an optical data storage device, and the like.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for receiving downlink control information, comprising:
    receiving first downlink control information sent by a base station through a first subslot, the first downlink control information comprising time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by the base station, wherein the count of repeated transmissions indicated by the repeat count indication information is n;
    determining n second subslots according to the count n indicated by the repeat count indication information and a preset time-frequency position determination rule, the n second subslots being subslots through which the base station repeatedly sends the target communication data; and
    not executing an operation of receiving second downlink control information in the n second subslots, a type of the second downlink control information being identical with a type of the first downlink control information.

2. The method of claim 1, wherein receiving the first downlink control information sent by the base station through the first subslot comprises:
    performing blind detection for the first downlink control information in a physical downlink control channel (PDCCH) in the first subslot based on a preset blind detection strategy, the preset blind detection strategy being identical with a strategy for blind detection for short downlink control information (sDCI).

3. The method of claim 1, wherein a length of the first downlink control information is identical with a length of the sDCI.

4. The method of claim 1, wherein the first downlink control information comprises an indication identifier, configured to indicate that the first downlink control information is downlink control information comprising the time-frequency position indication information and the repeat count indication information.

5. The method of claim 4, wherein a length of the indication identifier is one bit.

6. A method for sending downlink control information, comprising:
    scrambling first downlink control information based on a preset radio network temporary identifier (RNTI), a type of the preset RNTI being identical with a type of an RNTI used by a base station to scramble short downlink control information (sDCI), the first downlink control information comprising time-frequency position indication information and repeat count indication information; and
    sending the scrambled first downlink control information to user equipment (UE) through a first subslot;
    wherein the time-frequency position indication information is configured to indicate a time-frequency position of a downlink resource bearing target communication data in the first subslot, and the repeat count indication information is configured to indicate a count of repeated transmissions of the target communication data by the base station.

7. The method of claim 6, wherein a length of the first downlink control information is identical with a length of the sDCI.

8. The method of claim 6, wherein the first downlink control information comprises an indication identifier, configured to indicate that the first downlink control information is downlink control information comprising the time-frequency position indication information and the repeat count indication information.

9. The method of claim 8, wherein a length of the indication identifier is one bit.

10. User equipment, comprising:
    a processor; and
    a memory for storing instructions executable by the processor;
    wherein the processor is configured to:
    receive first downlink control information sent by a base station through a first subslot, the first downlink control information comprising time-frequency position indication information and repeat count indication information, wherein the time-frequency position indication information is configured to indicate a time-frequency position of a downlink resource bearing target communication data in the first subslot, and the repeat count indication information is configured to indicate a count of repeated transmissions of the target communication data by the base station, wherein the count of repeated transmissions indicated by the repeat count indication information is n;
    determine n second subslots according to the count n indicated by the repeat count indication information and a preset time-frequency position determination rule, the n second subslots being subslots through which the base station repeatedly sends the target communication data; and not execute an operation of receiving second downlink control information in the n second subslots, a type of the second downlink control information being identical with a type of the first downlink control information.

11. The user equipment of claim 10, wherein the processor is configured to:

perform blind detection for the first downlink control information in a physical downlink control channel (PDCCH) in the first subslot based on a preset blind detection strategy, the preset blind detection strategy being identical with a strategy for blind detection for short downlink control information (sDCI).

12. The user equipment of claim 10, wherein a length of the first downlink control information is identical with a length of the sDCI.

13. The user equipment of claim 10, wherein the first downlink control information comprises an indication identifier, configured to indicate that the first downlink control information is downlink control information comprising the time-frequency position indication information and the repeat count indication information.

14. A base station, comprising:
a processor; and
a memory for storing instructions executable by the processor;

wherein the processor is configured to:

scramble first downlink control information based on a preset radio network temporary identifier (RNTI), a type of the preset RNTI being identical with a type of an RNTI used by the base station to scramble short downlink control information (sDCI), the first downlink control information comprising time-frequency position indication information and repeat count indication information; and send the scrambled first downlink control information to user equipment (UE) through a first subslot;

wherein the time-frequency position indication information is configured to indicate a time-frequency position of a downlink resource bearing target communication data in the first subslot, and the repeat count indication information is configured to indicate a count of repeated transmissions of the target communication data by the base station.

15. The base station of claim 14, wherein a length of the first downlink control information is identical with a length of the sDCI.

16. The base station of claim 14, wherein the first downlink control information comprises an indication identifier, configured to indicate that the first downlink control information is downlink control information comprising the time-frequency position indication information and the repeat count indication information.

* * * * *